United States Patent

Ishii et al.

[11] Patent Number: 6,092,368
[45] Date of Patent: Jul. 25, 2000

[54] FUNCTION DIAGNOSTIC SYSTEM FOR AN EXHAUST GAS PURIFYING APPARATUS IN AN INTERNAL COMBUSTION ENGINE

[75] Inventors: Toshio Ishii, Mito; Toshio Manaka, Hitachinaka; Yutaka Takaku, Mito; Kiyoshi Miura, Tokai-mura, all of Japan

[73] Assignee: Hitachi, Ltd., Tokyo, Japan

[21] Appl. No.: 08/808,834

[22] Filed: Feb. 28, 1997

[30] Foreign Application Priority Data

Mar. 1, 1996 [JP] Japan .................................... 8-044450

[51] Int. Cl.$^7$ ........................................... F01N 3/00
[52] U.S. Cl. .............................. 60/277; 60/276; 73/118.1
[58] Field of Search ........................ 60/274, 276, 277; 73/118.1

[56] References Cited

U.S. PATENT DOCUMENTS

| | | | |
|---|---|---|---|
| 5,228,287 | 7/1993 | Kuronishi et al. | 60/276 |
| 5,404,718 | 4/1995 | Orzel et al. | 60/274 |
| 5,412,941 | 5/1995 | Suzuki et al. | 60/277 |
| 5,417,061 | 5/1995 | Maeda et al. | 60/277 |
| 5,524,433 | 6/1996 | Adamczyk, Jr. et al. | 60/276 |
| 5,584,176 | 12/1996 | Meyer et al. | 60/274 |
| 5,636,514 | 6/1997 | Seki | 60/277 |

FOREIGN PATENT DOCUMENTS

| | | |
|---|---|---|
| 62-153546 | 7/1987 | Japan . |
| 64-56554 | 4/1989 | Japan . |
| 4-109021 | 4/1992 | Japan . |
| 4-116241 | 4/1992 | Japan . |
| 4-116242 | 4/1992 | Japan . |

*Primary Examiner*—Thomas E. Denion
*Attorney, Agent, or Firm*—Antonelli, Terry, Stout & Kraus, LLP

[57] ABSTRACT

In a diagnostic system for an exhaust gas purifying apparatus in an internal combustion engine, such as a diagnostic system suitable for evaluating the exhaust gas purifying performance of a specific component, as an exhaust gas component concentration corresponding to an operating condition of the engine or an operating condition of the catalyst is detected using an exhaust gas component system, and the evaluation and diagnosis of the exhaust gas purifying apparatus are conducted on the basis of the thus-detected value directly or after subjecting it to an integral processing. With such a diagnostic system, it is not necessary to dispose a sensor upstream of the catalyst in the exhaust gas purifying apparatus, for diagnosis of the catalyst, thus permitting the system to be less expensive, highly durable and afford a high diagnostic accuracy according to operating conditions.

10 Claims, 10 Drawing Sheets

FUNCTION DIAGNOSTIC SYSTEM FOR AN EXHAUST GAS PURIFYING APPARATUS IN AN INTERNAL COMBUSTION ENGINE

BACKGROUND OF THE INVENTION

The present invention relates to a system for checking the function of a catalyst used to purify the exhaust gas in an internal combustion engine. In particular, the invention is concerned with a function diagnostic system for an exhaust gas purifying apparatus in an internal combustion engine, which diagnostic system has suitable for evaluating the exhaust gas purifying performance for a specific component.

Heretofore there has been adopted a method in which $O_2$ sensors are disposed upstream and downstream of a catalyst, and whether the catalyst, is deteriorated or not is judged by comparing the outputs of both sensors. In this case, it is actually the $O_2$ storage capacity out of the various catalyst functions that is measured, rather than the conversion efficiency of each exhaust gas component.

According to the above conventional method, when the conversion efficiency is determined independently of the $O_2$ storage capacity, it is impossible to make an accurate detection of the conversion efficiency. For solving this problem, the use of a sensor for detecting a specific exhaust gas component, instead of an $O_2$ sensor, may be effective in measuring the conversion efficiency of that exhaust gas component. An example of using an HC sensor for detecting the conversion efficiency of HC (hydrocarbon) is disclosed in Japanese Patent Laid Open No. 109021/92. According to the method disclosed therein, however, it is necessary to dispose HC sensors both upstream and downstream of a catalyst. Therefore, the environmental conditions, particularly around the upstream-side HC sensor, are severe (for example, high temperature and high exhaust gas component concentrations), thus resulting in the sensitivity and output characteristic of the sensor itself being deteriorated. This eventually exerts a bad influence on the diagnostic accuracy for catalyst deterioration.

SUMMARY OF THE INVENTION

It is an object of the present invention to provide a function diagnostic system for an exhaust gas purifying apparatus in an internal combustion engine, which system uses the output of an exhaust gas component sensor disposed downstream of a catalyst, thereby providing a system can attain low cost, excellent durability and high diagnostic accuracy.

According to the present invention, in order to achieve the above-mentioned object, an exhaust gas component concentration corresponding to an operating condition of the engine and that of the catalyst is detected downstream of the catalyst, and the detected value is subjected to evaluation and diagnosis directly or after an integral processing. Since it is not necessary to dispose a sensor upstream of the catalyst for diagnosis of the catalyst, the function diagnostic system of the present invention is inexpensive and possesses high durability and high diagnostic accuracy.

DESCRIPTION OF THE PREFERRED EMBODIMENTS

Figure 1:
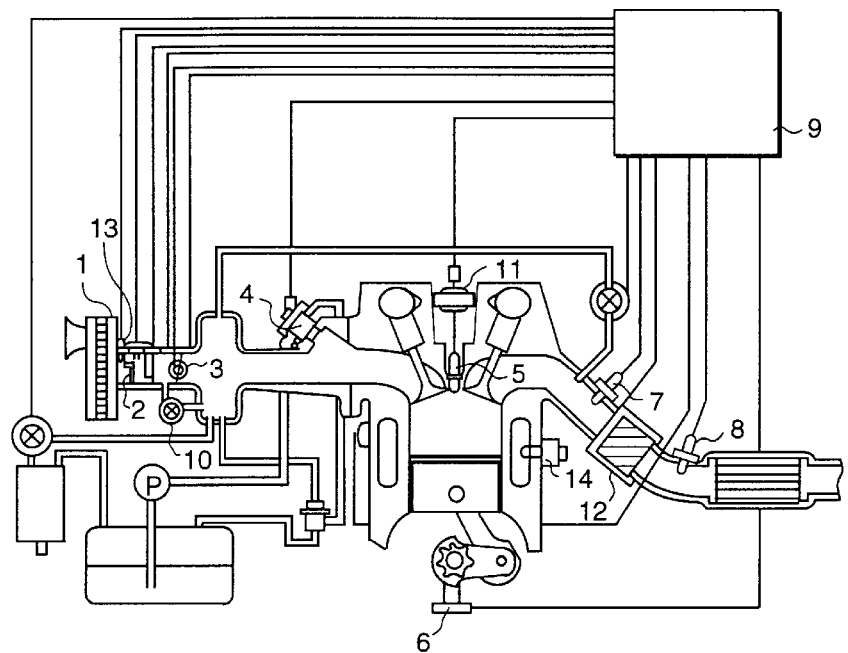
FIG. 1 is a diagram showing the construction of a catalyst diagnostic system.

An embodiment of the present invention will now be described with reference to the accompanying drawings. FIG. 1 is a diagram showing an internal combustion engine associated with the present invention. In FIG. 1, the reference numeral 1 denotes an air cleaner mounted in an air intake passage, and the numeral 2 denotes an air flow sensor for detecting the amount of air introduced into the internal combustion engine (simply engine hereinafter). The value detected by the air flow sensor 2 is fed to a control unit 9. Numeral 3 denotes a throttle valve opening sensor for detecting the degree of opening of a throttle valve. The value detected by the throttle valve opening sensor 3 is fed to the control unit 9 and is utilized for control. Numeral 4 denotes an injector for the injection of fuel. The injector 4 injects fuel into the engine in accordance with a command provided from the control unit 9. Numeral 11 denotes an ignition coil integrated with a power switch. Upon receipt of an ignition signal from the control unit 9 the ignition coil 11 supplies a secondary voltage for ignition to an ignition plug 5. Numeral 12 denotes a catalyst for purifying the exhaust gas discharged from the engine. Numeral 7 denotes an oxygen sensor disposed upstream of the catalyst 12. Numeral 8 denotes an HC sensor disposed downstream of the catalyst 12. Numeral 6 denotes a rotation angle sensor for detecting information on the rotation of the engine. Numeral 10 denotes an ISC valve for controlling the idling speed of the engine. Numeral 13 denotes an intake air temperature sensor for detecting the temperature of air introduced into the engine, and numeral 14 denotes a water temperature sensor for detecting the temperature of water used for cooling the engine. In accordance with signals provided from the crank angle sensor 6, air flow sensor 2, water temperature sensor 14 and intake air temperature sensor 13, the control unit 9 judges in what operating condition the engine is, then calculates an amount of fuel to be supplied to the engine and an ignition timing, drives the injector 4 to inject the thus-calculated amount of fuel, and supplies an ignition signal to the ignition coil 11 integral with a power switch, thereby allowing ignition to take place at the ignition plug 5. Moreover, the control unit 9 drives the ISC valve 10 to maintain the idling speed of the engine at a target value. Further, with the $O_2$ sensor 7 disposed downstream of the engine and upstream of the catalyst 12, the oxygen concentration is detected, and, on the basis thereof, the control unit 9 effect a feedback control for the amount of fuel to be supplied to keep the air-fuel ratio at a value near the stoichiometric ratio.

Additionally, on the basis of the output of the crank angle sensor 6, the control unit 9 calculates the rotational speed of the engine, and when the control unit detects that the engine is operating in a catalyst diagnostic region for diagnosis of the catalyst 12 on the basis of data on the amount of intake air which is obtained from a signal provided from the air flow sensor 2 and also on the basis of a signal provided from the water temperature sensor 14, the control unit performs diagnosis of the catalyst 12.

Figure 2:
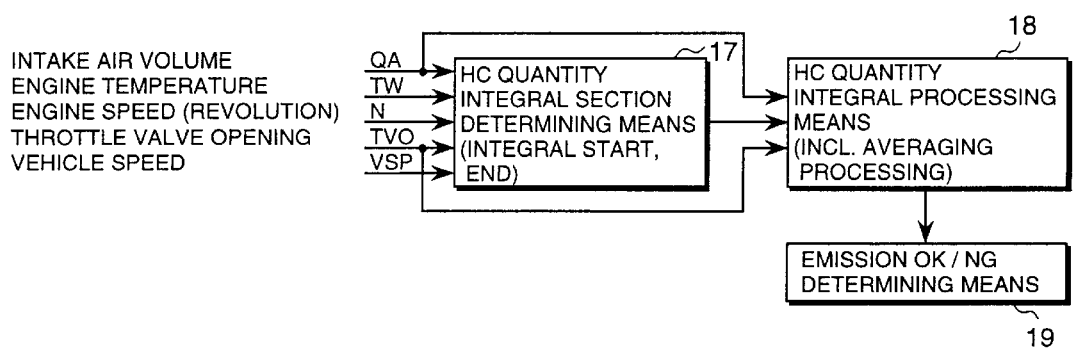
FIG. 2 is a diagram showing in what manner a signal provided from an exhaust component sensor is subjected to an integral processing.

FIG. 2 shows in what manner an HC sensor signal is subjected to an integral processing and is used for diagnosis. An integral section is determined in an HC quantity integral section determining means 17 in accordance with engine status signals, namely signals indicative of intake air volume QA, engine temperature TW, engine speed N, throttle valve opening angle TVO, and vehicle speed VSP. For the section thus determined, the amount of HC discharged is integrated by an HC quantity integrating means 18, followed by averaging. It is optional whether the averaging is to be carried out using the intake air volume $\int QAdt$ or the running distance $\int VSPdt$.

A mean value of HC quantity is:

$$IT = \int HC \times QA \times (HC \text{ to air molecular weight ratio}) \, dt / \int QAdt \ (g/kg)$$

or $$IT = \int HC \times QA \times (HC \text{ to air molecular weight ratio}) \, dt / \int VSPdt \ (g/km)$$

If the mean value IT exceeds a predetermined value, an emission OK/NG discriminating means 19 judges the result to be NG (no good), while if not, the discriminating means 19 judges the result to be OK.

Figure 3:
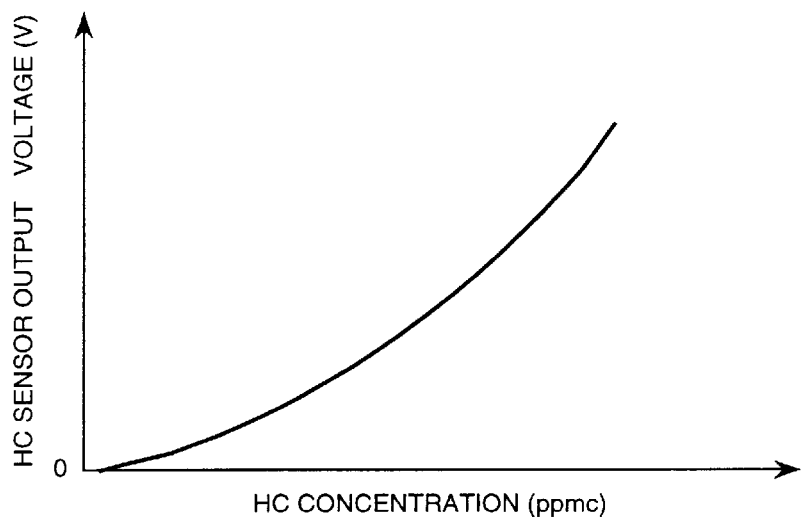
FIG. 3 is a diagram showing an output characteristic of an HC sensor.

FIG. 3 is a characteristic diagram showing a relation between an HC sensor output voltage and the concentration of HC. The HC concentration can be detected from the sensor voltage.

Figure 4:
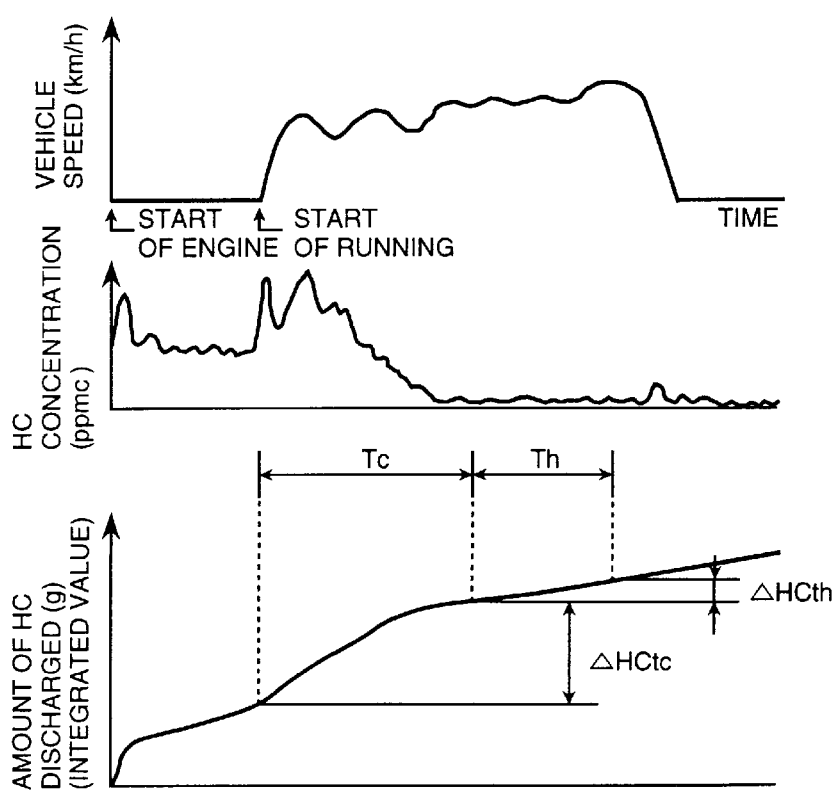
FIG. 4 is a diagram showing the amount of HC discharged at start-up of an engine in a cold state and an integrated value.

FIG. 4 shows how the amount of HC discharged from the catalyst changes as the engine starts in a cold state and operates. Just after the start of the engine, HC is not purified because the catalyst 12 is also cold, and a large amount of HC is discharged. Thereafter, the catalyst temperature rises and the amount of HC discharged decreases rapidly. At this time, the integrated value of the HC quantity increases as shown in FIG. 4, in which the latter half exhibits a gentle increase. In an integral section Tc it is possible to know the percent purification of HC during activation of the catalyst. In this embodiment, the period Tc corresponds to the period in which the integrated value of the intake air volume QA is within a predetermined range f1(TWS)~f2(TWS). In an integral section Th, it is possible to know the percent purification of HC after activation of the catalyst. The period Th in this embodiment is a predetermined period which starts from the time when the integrated value of the intake air volume QA has become f2 (TWS). The start and end of the periods Tc and Th may each depend on the time elapsed after the start of the engine, or both periods may be made functions of the catalyst temperature. More specifically, in this embodiment Tc was set to a period in which the catalyst temperature is within a predetermined range (a catalyst temperature 100–300° C. period in another embodiment), while Th was set to a predetermined period (30 seconds in another embodiment) after arrival of the catalyst temperature at a predetermined temperature (400° C. in another embodiment) and after subsequent lapse of a predetermined period (5 seconds in another embodiment).

Figure 5:
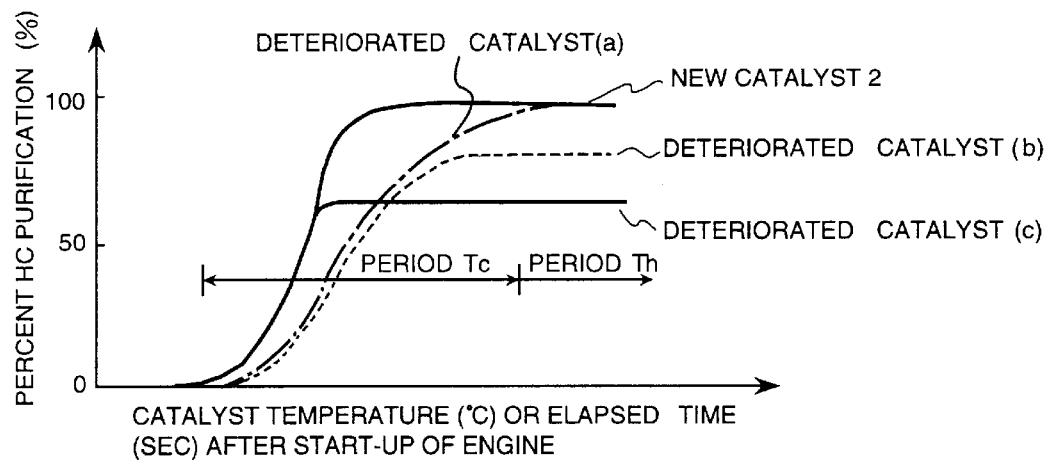
FIG. 5 is a diagram showing a relation between an HC purifying efficiency of a catalyst and the temperature of the catalyst.

FIG. 5 is a characteristic diagram showing how the percent HC purification of the catalyst and the catalyst temperature are related to each other. The relation is shown therein with respect to a new catalyst which has not deteriorated at all and deteriorated catalysts (a), (b) and (c). As to the deteriorated catalyst (a), it is a high catalyst temperature at which the percent purification of 98% (corresponding to the new catalyst) is attained. As to the deteriorated catalyst (b), the percent purification is low as a whole. As to the deteriorated catalyst (c), the percent purification after activation is low although the catalyst temperature at which activation starts is the same as that of the new catalyst. Accurate diagnosis of all of these deteriorated catalysts is required.

Figure 6:
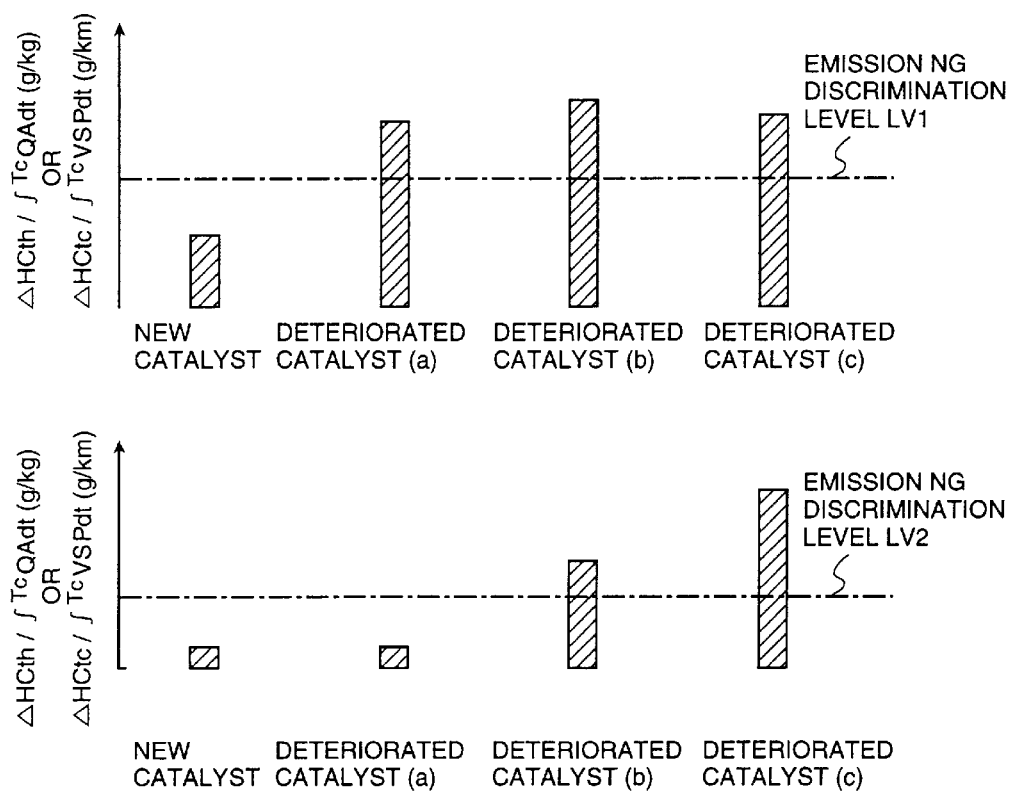
FIG. 6 is a diagram showing a relation between a catalyst deterioration mode and a mean value of the amount of HC discharged.

FIG. 6 shows the foregoing mean value IT of the HC quantity determined with respect to each of the above deteriorated catalysts.

By selecting the integral periods Tc and Th appropriately and by setting an emission NG discrimination level, it is made possible to form a good judgment on the deteriorated catalysts (a), (b) and (c).

Figure 7:
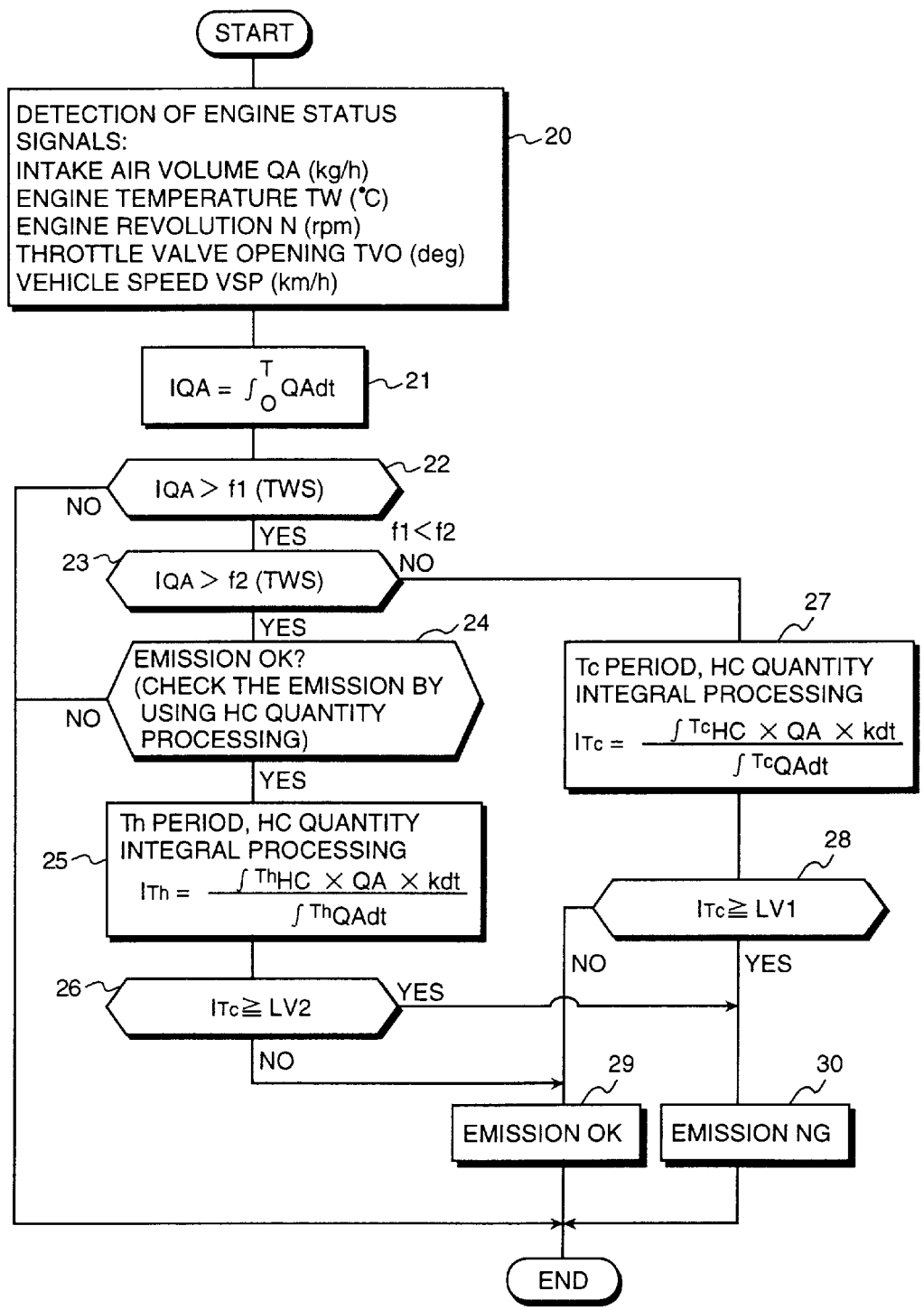
FIG. 7 is a flow chart of an integral processing method.

FIG. 7 is a flow chart of the processing performed according to the present invention. In step 20, various engine status signals are detected, namely QA, TW, N, TVO, and VSP. In step 21, the intake air volume QA is integrated for estimating the catalyst temperature. Then, in step 22, a check is made to see if the QA integrated value IQA is larger than f1(TWS). The valve f1(TWS) is a level of the QA integral value for judging an HC integration start timing Tc, and it is a function of TWS. The designation TWS stands for engine temperature TW at start-up of the engine. If IQA is smaller than f1(TWS), the processing flow is terminated, while if it is larger than f1(TWS), then in step 23 a check is made to see if it is larger than f2(TWS). Instead of going through the above steps 21, 22 and 23 the HC quantity integrating section may be determined on the basis of catalyst temperature, elapsed time after start-up of the engine, exhaust gas temperature, engine r.p.m., engine load, and running distance. The valve f2(TWS) is a level of the QA integral value for judging an HC integration start timing Th, and it is a function of TWS. If IQA is smaller than f2(TWS), then in step 27 there is performed a TC period, HC quantity integrating and an averaging processing to obtain an HC mean value ITc. If ITc is not smaller than an NG discrimination level LV1, it is judged in step 30 that the emission is NG. If ITc is smaller than LV1, it is judged in step 29 that the emission is OK. If IQA is smaller than f2(TWS), a check is made in step 24 to see whether the emission judgment result in the HC quantity integrating period Tc is OK. Then, if the emission is NG, the processing flow is ended, while if the emission is OK, then in step 25 there is performed a Th period, HC quantity integrating and averaging processing to obtain an HC mean value ITh. If ITh is not smaller than an NG discrimination level LV2, it is judged in step 30 that the emission is NG. If ITh is smaller than LV2, it is judged in step 29 that the emission is OK.

Figure 8:
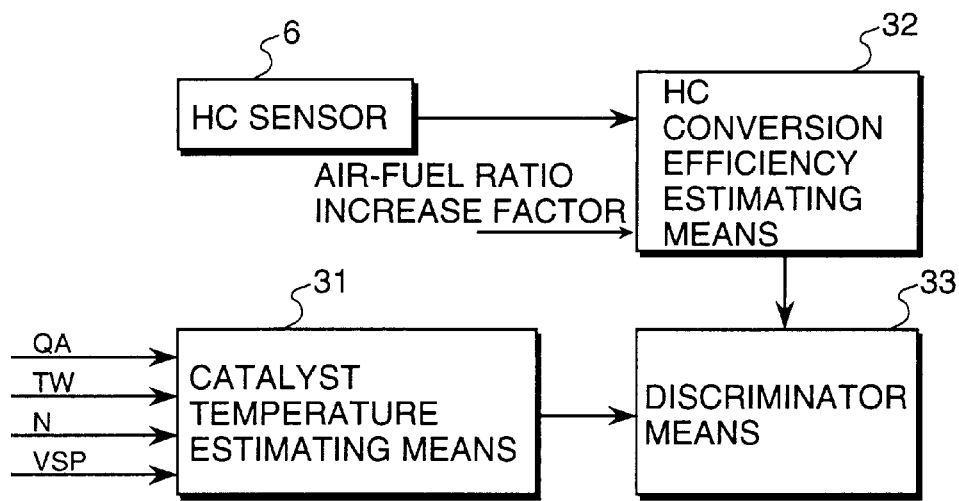
FIG. 8 is a block diagram showing the construction of a catalyst diagnostic method.

Referring now to FIG. 8, there is illustrated a method for estimating the catalyst temperature and for performing a diagnosis of the catalyst in accordance with an HC sensor signal in accordance with the catalyst temperature. On the basis of QA, TW, N, and VSP the catalyst temperature is estimated in a catalyst temperature estimating means 31. From a signal provided from the HC sensor 8 and an air-fuel ratio increase factor, an HC conversion efficiency is estimated by an HC conversion efficiency estimating means 32. Then, from the thus-estimated catalyst temperature and HC conversion efficiency, a discriminator means 33 judges whether the catalyst has deteriorated or not.

Figure 9:
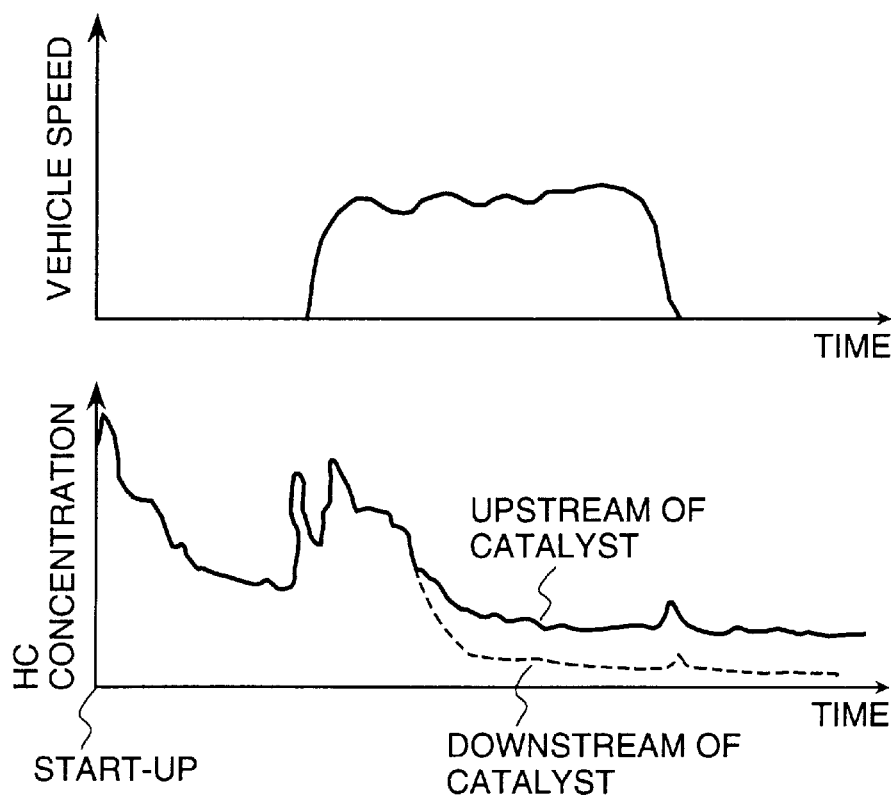
FIG. 9 is a diagram showing how the amount of HC changes upstream of the catalyst.

FIG. 9 shows how the concentration of HC changes upstream of the catalyst as the engine starts in a cold state and operates. While the engine is cold just after start-up, the vaporization of fuel is unsatisfactory and it is difficult for combustion to become stable, therefore, the amount of fuel is increased beyond the stoichiometric ratio. Also during acceleration, the amount of fuel is increased. While such an increase in the amount of fuel is occurring, surplus fuel, i.e., HC, is discharged upstream of the catalyst. While a fuel increase is not occurring, the HC concentration upstream of the catalyst is stable at 2000 ppm or so. That is, the HC concentration upstream of the catalyst can be estimated from a fuel increase factor, which indicates the degree of fuel increase. Accordingly, from this estimated HC concentration upstream of the catalyst and a signal provided from the HC sensor 8, an HC conversion efficiency of the catalyst can be estimated by the HC conversion efficiency estimating means 32.

Preferably, the estimated value of HC concentration upstream of the catalyst is corrected in accordance with an engine status signal, e.g. TW, whereby it becomes possible to estimate the HC conversion efficiency of the catalyst more accurately.

Figure 15:
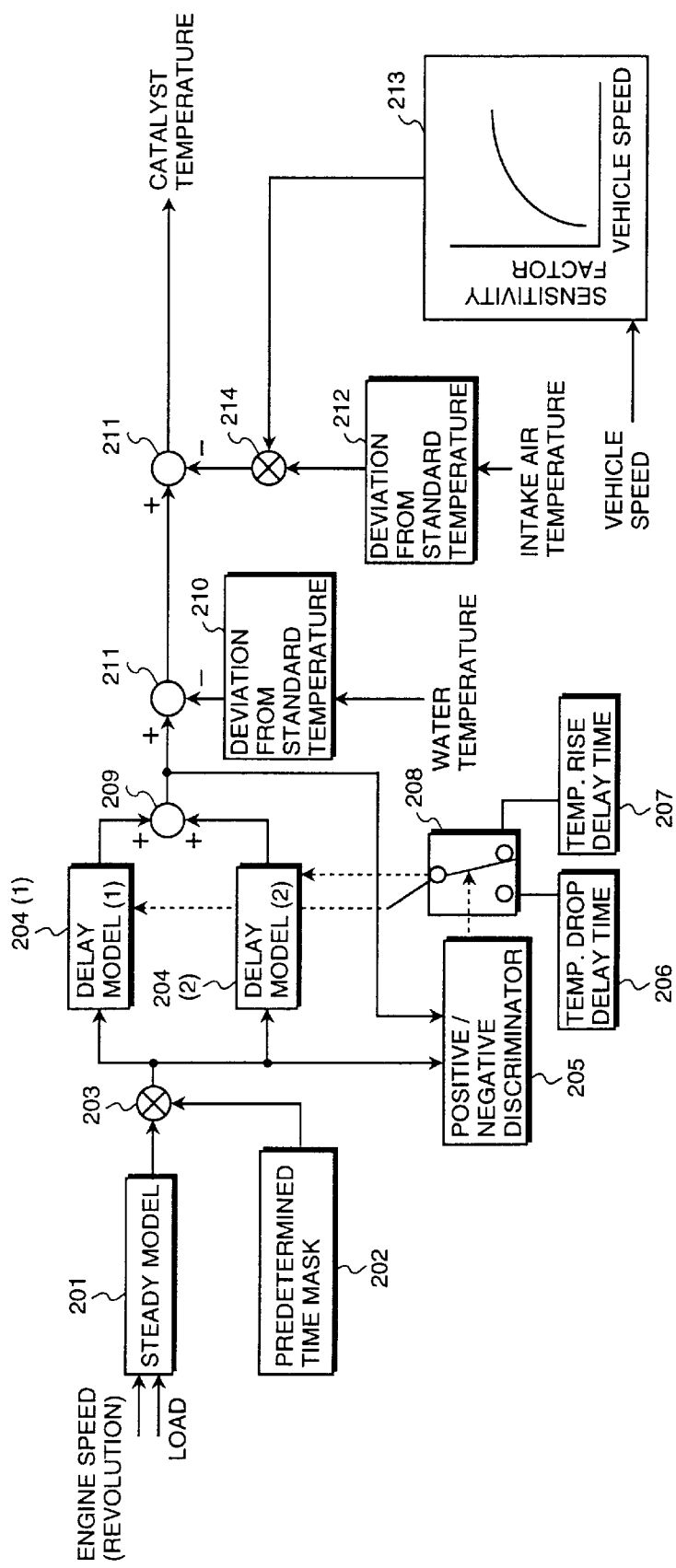
FIG. 15 is a block diagram showing a catalyst temperature estimating method.

Now, a description will be given of the catalyst temperature estimating means described in step 31 in FIG. 8. In this connection, reference is here made to FIG. 15, in which the catalyst temperature in a steady state is determined using a steady model 201. A predetermined time mask 202 measures an elapsed time after start-up of the engine and outputs 0 until the lapse of a predetermined time; then, after the lapse of the predetermined time, it outputs 1. Multiplication is performed by a multiplier 203 and the result is given a delay by two types of delay models 204(1) and 204(2). A temperature drop delay time 206 is stored separately from a temperature rise delay time 207, and these are switched over from one to the other by a positive/negative discriminator 205. Outputs of the delay models 204(1) and 204(2) are added by an adder 209 to determine an estimated catalyst temperature. Next, in step 210, a deviation between the temperature of the water and a standard temperature is calculated and correction is made in step 211. Likewise, in step 212 a deviation between the temperature of the intake air and a standard temperature is calculated and correction is made in step 215. Further, a correction quantity based on the vehicle speed is calculated in step 213 and the correction quantity of the intake air temperature is corrected in step 214.

Figure 10:
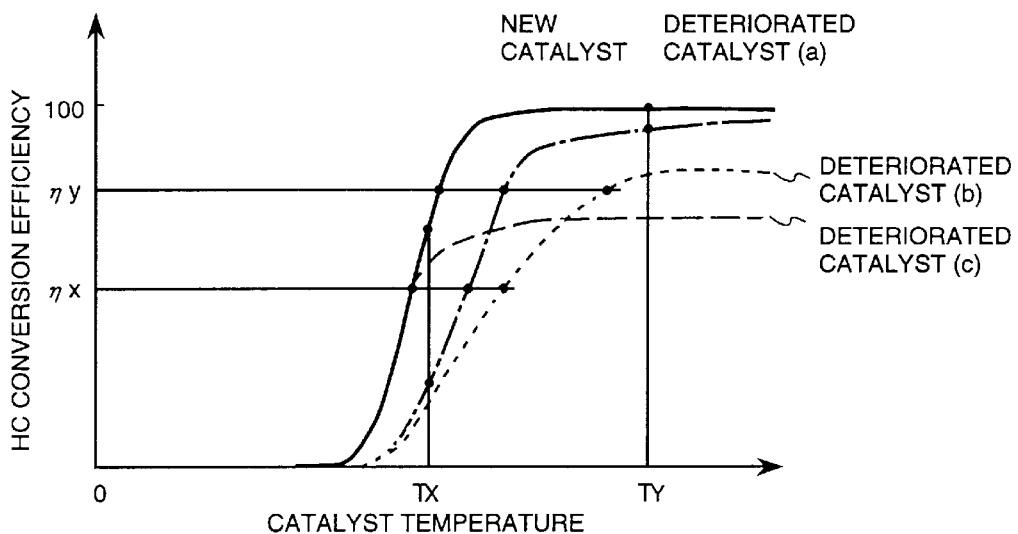
FIG. 10 is a diagram showing a relation between the temperature of the catalyst and HC conversion efficiency.

FIG. 10, like FIG. 5, is a characteristic diagram showing a relation between the HC conversion efficiency of a catalyst and the catalyst temperature. Since both the HC conversion efficiency of the catalyst and the catalyst temperature are estimated, it is possible to detect characteristics in the course of warming-up of the catalyst. For example, it is possible to detect an HC conversion efficiency at a catalyst temperature of Tx or Ty, or conversely, to detect a catalyst temperature at an HC conversion efficiency of $\eta x$ or $\eta y$.

If Tx is set at 300° C. or so, it is possible to detect an HC conversion efficiency at the rise of the conversion efficiency or thereabouts, and if Ty is set at 500° C. or so, it is possible to detect an HC conversion efficiency after catalyst activation.

Further, if x is set at 50% or so, it is possible to detect a temperature (usually about 300° C.) at the rise of the conversion efficiency or thereabouts, and if y is set at 90% or so, it is possible to detect a temperature (usually about 400–500° C.) at which the catalyst is activated almost completely.

Figure 11:
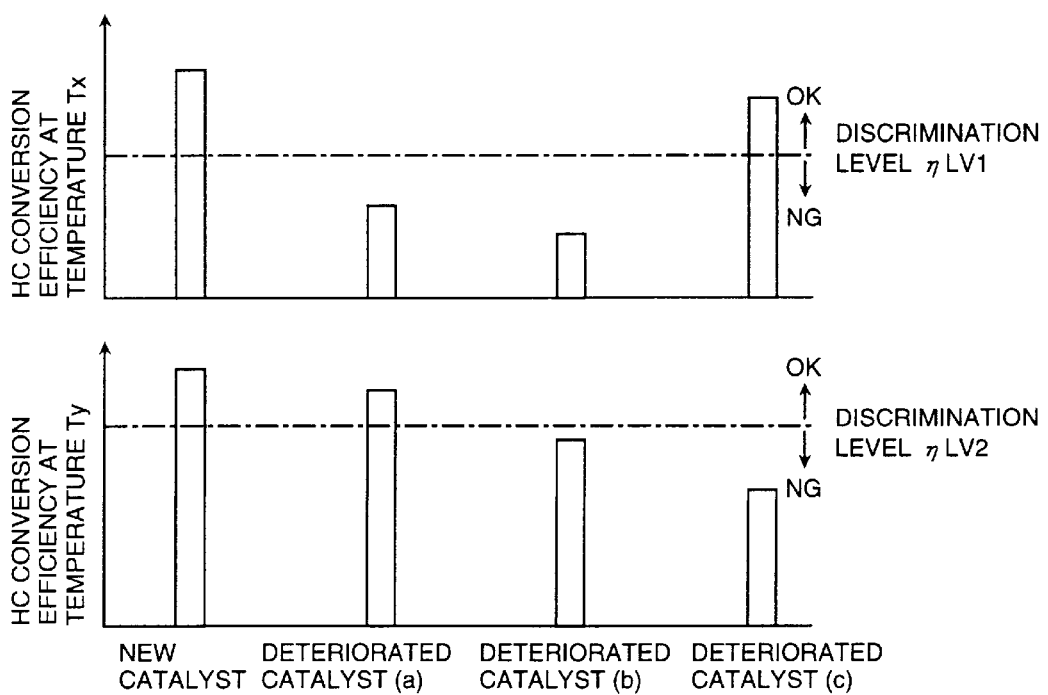
FIG. 11 is a diagram showing catalyst temperature vs. HC conversion efficiency.

FIG. 11 shows the results of having detected HC conversion efficiencies at Tx and Ty temperatures with respect to deteriorated catalysts. If a detected conversion efficiency is lower than a discrimination level, the associated catalyst is judged to be NG in connection with the corresponding temperature. At the temperature Tx, the deteriorated catalysts (a) and (b) can be regarded as NG, and at the temperature Ty the deteriorated catalysts (b) and (c) can be regarded as NG. By selecting appropriate values of Tx, Ty and discrimination levels LV1, LV2 and by finally regarding a deteriorated catalyst as NG if the deteriorated catalyst is judged to be NG at one of the discrimination levels, it is possible to regard all of the deteriorated catalysts (a), (b) and (c) as NG.

Figure 12:
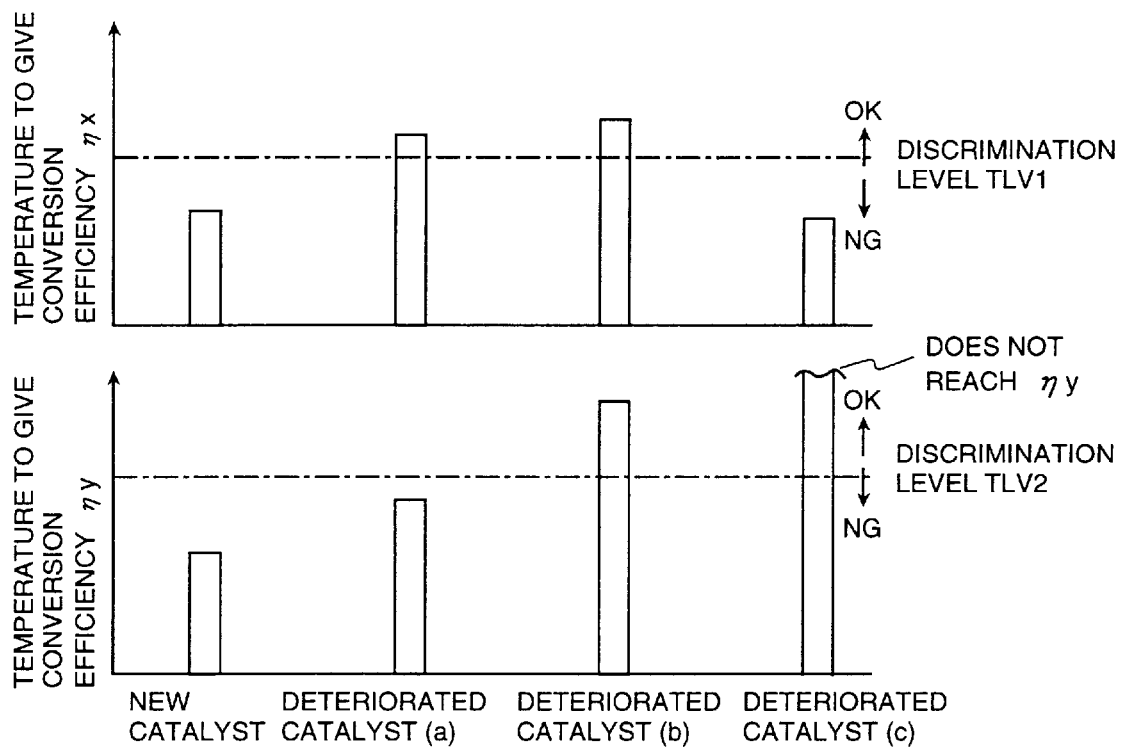
FIG. 12 is a diagram showing a catalyst temperature which affords a predetermined HC conversion efficiency.

FIG. 12 shows the results of having determined catalyst temperatures corresponding to HC conversion efficiencies of x and y with respect to the deteriorated catalysts. If a catalyst temperature is above a discrimination level, the associated catalyst is judged to be NG in connection with the corresponding HC conversion efficiency. At the conversion efficiency $\eta x$, the deteriorated catalysts (a) and (b) can be regarded as NG, while at the conversion efficiency y the deteriorated catalysts (b) and (c) can be regarded as NG. By selecting appropriate values of $\eta x$, $\eta y$ and discrimination levels TLV1, TLV2 and by finally regarding a deteriorated catalyst as NG if the deteriorated catalyst is judged to be NG at one of the discrimination levels, it is possible to regard all of the deteriorated catalysts (a), (b) and (c) as NG.

In this case, even if a deteriorated catalyst is judged to be NG when its HC conversion efficiency at the discrimination level temperature TLV1 or TLV2 is below $\eta x$ or $\eta y$, it is possible to obtain the same discrimination result as above, and with the same discrimination flow as above.

Anyhow, the main point in this embodiment is that the discrimination level is changed according to catalyst temperatures in order to determine the HC conversion efficiency of the catalyst, which varies with temperature. No limitation is placed on the actual flow.

Figure 13:
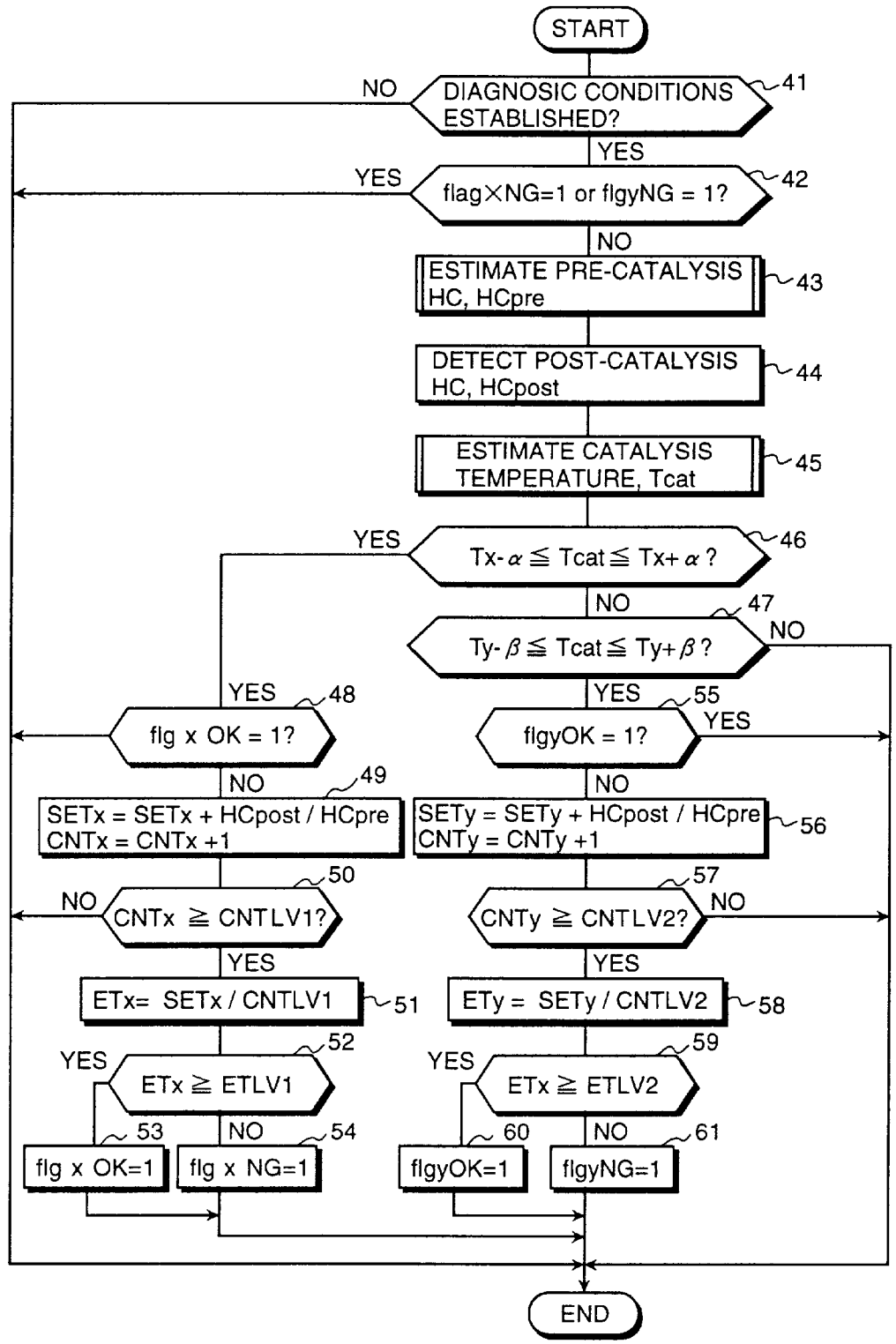
FIG. 13 is a flow chart of a catalyst deterioration diagnostic process (1)

FIG. 13 shows an example of the processing in a flow chart. This process flow is started, for example, at every predetermined cycle from a main routine (not shown). CNTx, y, flgxOK, NG, and flgyOK, NG, which will be described later, are initialized to 0 at the time of start-up of the engine by means of an initializing routine (not shown). First in step 41, a check is made to see if diagnostic conditions are established. More specifically, a check is made to see if, for example, QA is within a predetermined range, the fuel increase factor is approximately zero, and further if the HC sensor 8 the, air flow sensor 2 the, fuel control system, including injector 4 and $O_2$ sensor 7, and the ignition system, including ignition coil 11 and ignition plug 5, are operating in a normal condition. For example, if the fuel control system is not operating in a normal condition, the air-fuel ratio is not controlled to the stoichiometric ratio and shifts from the operating point of the catalyst, so it is possible that a normal catalyst will be regarded as NG. Also, when there is some trouble in the ignition system and a misfire occurs, the HC concentration upstream of the catalyst becomes high or the catalyst temperature becomes high, both to an abnormal extent, so that it is likely that a normal catalyst will be regarded as NG. For avoiding such an erroneous diagnosis, a check is made to see if the diagnostic conditions are established. If the answer is affirmative, then in step 42 it is determined, whether a judgment of NG has already been made or not (flgxNG=1 and flgyNG=1 mean that a judgment of NG has already been made). If the answer is affirmative, this routine is ended. On the other hand, if the answer is negative, a pre-catalysis HC concentration, HCpre, is estimated in step 43, then a post-catalysis HC concentration, HCpost, is measured in step 44. Further, the catalyst temperature, Tcat, is estimated in step 45; then, in steps 46 and 47, if Tcat is within the range of Tx±α (during warming-up), the processing flow advances to sep 48, while if Tcat is within the range of Ty±β (after warming-up), the processing flow shifts to step 55. If the answer falls under neither of these conditions, this routine is ended.

If Tcat is within the range of Tx±α, a check is made in step 48 to see if a judgment of OK has already been made or not, and if the answer is affirmative, this routine is ended, while if the answer is negative, the processing flow advances to step 49. In step 49, as processings for obtaining a mean value of HC conversion efficiency values there are performed both addition of the HC conversion efficiency (HCpost/HCpre) to a total value SETx of HC conversion efficiency values and an incrementing of an addition count counter CNTx. In step 50, a check is made to see if the addition count has reached a predetermined count CNTLV1, and if the answer is negative, this routine is ended, while if the addition count has reached the predetermined count or more, the processing flow advances to step 51. In step 51 there is calculated an average HC conversion efficiency ETx. In step 52 a comparison is made between ETx and a discrimination value ETLV1, and if ETx is not smaller than the discrimination value, there is formed a judgment of OK and 1 is set to flgxOK in step 53. On the other hand, if ETx is smaller than the discrimination value, there is formed a judgment of NG and 1 is set to flgxNG in step 54.

When Tcat is within the range of Ty±β, it is checked whether the judgment of OK has already been made in step 55, and if the answer is affirmative, this routine is ended, while if the answer is negative, the processing flow advances to step 56. In step 56, as processings for obtaining a mean value of HC conversion efficiency values, there are performed both addition of the HC conversion efficiency (HCpost/HCpre) to a total value SETy of HC conversion efficiency values and an incrementing of an addition count counter CNTy. Then, in step 57 it is checked whether the addition count has reached a predetermined count CNTLV2, and if the answer is negative, this routine is ended. On the other hand, if the addition count has reached the predetermined count or more, the processing flow advances to step 58. In step 58, there is calculated an average HC conversion efficiency ETy. Then, in step 59 a comparison is made between ETy and a discrimination value ETLV2, and if ETy is not smaller than the discrimination value, there is formed a judgment of OK and 1 is set to flgyOK in step 60. If ETy is smaller than the discrimination value, there is formed a judgment of NG and flgyNG is set to 1 in step 61.

Figure 14:
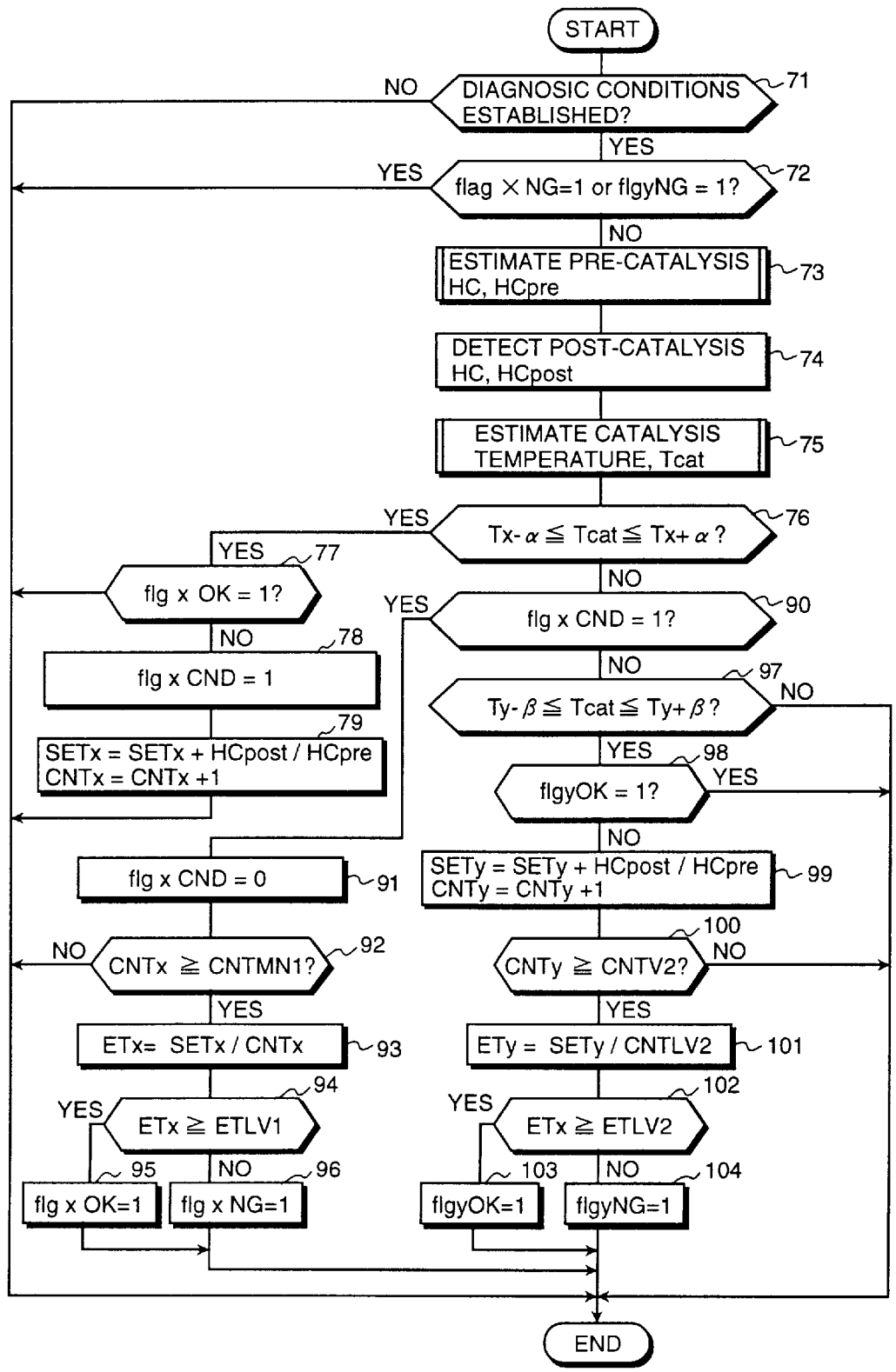
FIG. 14 is a flow chart of a catalyst deterioration diagnostic process (2)

In the judgment of the HC conversion efficiency during warming-up, since the period in which the catalyst temperature is within the range of Tx±α is often short, if the count CNTLV1 for integration and averaging of HC conversion efficiency values is set to be large, the catalyst temperature will rise before reaching the set value and is very likely to go beyond the above range. On the other hand, if CNTLV1 is set to be small, a lowering of the accuracy usually results. It is the flow chart of FIG. 14 that shows an example for solving such a problem. In FIG. 14, steps 71 to 75 are the same as in steps 41 to 45 in FIG. 13. In step 76, if Tcat is within the range of Tx±α (during warming-up), the processing flow advances to step 77 and a check is made to see if the judgment of OK has already been made or not. If the answer is negative, then in step 78 flgxCND is set to 1, which flag indicates that Tcat is within the range of Tx±α. In step 79, as processings for obtaining a mean value of HC conversion efficiency values, there are performed addition of the HC conversion efficiency (HCpost/HCpre) to a total value SETx of HC conversion efficiency values and an incrementing of the addition count counter CNTx. Then, this routine is ended. If Tcat is not within the range of Tx±α in step 76, then in step 90 it is checked whether flgxCND is equal to 1. An affirmative answer indicates that Tcat deviated from the range of Tx±α for the first time after having once come under the said range. In this case, flgxCND is reset to 0 in step 91 then, in step 92 it is checked whether the count is not less than CNTMN1 which is a sufficient count for judgment, and if the answer is negative, this routine is ended (that is, the judgment during warming-up could not be completed). On the other hand, if the answer in step 92 is affirmative, an average HC conversion efficiency is calculated in step 93. Steps 94 to 96 are the same as steps 52 to 54 in FIG. 13. Also, steps 97 to 104 are the same as steps 47 and 55 to 61 in FIG. 13.

Although in the above embodiments there are two discrimination points based on catalyst temperature or conversion efficiency (Tx and Ty, or ηx and ηy), this is not a limitation of the invention. There may be one point or three or more points. The number and range of discrimination points may be determined according to a desired detection mode for example.

Although in the above embodiment even a single judgment of NG is not followed by any subsequent judgment, an alteration may be made according to the mode of NG to be detected. For example, if the HC conversion efficiency after warming-up is to be checked preponderantly, it is desirable to the judgment many times and make a final judgment on the basis of an average result. If the HC conversion efficiency during warming-up is to be judged preponderantly, it is desirable to repeat the judgment at each of several starts at a low temperature and then make a final judgment on the basis of an average result.

It goes without saying that a temperature sensor or the like may be used for measuring the catalyst temperature. In this case, it is not necessary to use the catalyst temperature estimating means 31.

If diagnostic conditions are limited to the case where the amount of fuel is not increased after warming-up of the engine to some extent (the case where there is made a feedback control to the stoichiometric ratio), it is possible to make a judgment on the basis of a signal (HC concentration downstream of the catalyst) provided from the HC sensor 8 without estimation of the HC conversion efficiency. In this case, it is possible to omit the HC conversion efficiency estimating means 32.

According to the function diagnostic system for an exhaust gas purifying system in an internal combustion engine incorporating the present invention, as set forth hereinabove, since the exhaust gas component sensor is used only in the environmental conditions downstream of the catalyst, both the durability and the reliability of the system are enhanced. Besides, since the number of sensors used becomes smaller, it is possible to realize a less expensive system configuration.

Further, since an HC concentration corresponding to the state of operation of the engine and that of the catalyst is detected downstream of the catalyst and the thus-detected value is evaluated directly or after an integral processing, it is not necessary to dispose a sensor upstream of the catalyst for diagnosis of the catalyst, and thus the diagnostic system of the invention is inexpensive and possesses high durability and high diagnostic accuracy.

What is claimed is:

1. A function diagnostic system for diagnosing functioning of an exhaust gas purifying apparatus of an internal combustion engine system, comprising means including an exhaust gas component sensor having an exhaust gas component detecting function, said exhaust gas component sensor being disposed downstream of the exhaust gas purifying apparatus in the internal combustion engine system, and means for checking the function of said exhaust gas purifying apparatus on the basis of an output of said exhaust gas component sensor located downstream of the exhaust gas purifying apparatus without the need for an upstream exhaust gas component sensor by subjecting the output of said exhaust gas component sensor disposed downstream of the exhaust gas purifying apparatus to an integral processing and checking the function of the exhaust gas purifying apparatus on the basis of the thus-integrated value, wherein said exhaust gas component sensor disposed downstream of the exhaust gas purifying apparatus comprises a sensor capable of detecting hydrocarbons (HC), and wherein the function checking means determines a mean value of HC quantity as:

$$IT = \int HC \times QA \times (HC \text{ to air molecular weight ratio}) \, dt / \int VSPdt \; (g/km)$$

where QA is intake air volume; and

VSP is vehicle speed.

2. A function diagnostic system according to claim 1, wherein the exhaust gas purifying apparatus is a catalyst, and further including at least one of means for determining an operating condition of said catalyst, means for determining an operating condition of said engine, and means for determining an operating condition of a vehicle driven by the engine, and wherein in accordance with at least one of the thus-determined operating condition of the catalyst, operating condition of the engine and operating condition of the vehicle, the output of said exhaust gas component sensor disposed downstream of the catalyst is evaluated to check the function of the catalyst.

3. A function diagnostic system according to claim 2, wherein when said determined operating condition of the catalyst has been judged to be a predetermined operating condition, the function of the catalyst is checked on the basis of the output of said exhaust gas component sensor disposed downstream of the catalyst.

4. A function diagnostic system according to claim 2, wherein when said determined operating condition of the engine has been judged to be a predetermined operating condition, the function of the catalyst is checked on the basis of the output of said exhaust gas component sensor disposed downstream of the catalyst.

5. A function diagnostic system according to claim 2, wherein when said determined operating condition of the vehicle has been judged to be a predetermined operating condition, the function of the catalyst is checked on the basis of the output of said exhaust gas component sensor disposed downstream of the catalyst.

6. A function diagnostic system according to claim 2 or claim 3, wherein the temperature of the catalyst is determined as the operating condition of the catalyst.

7. A function diagnostic system according to any of claims 1 to 5, wherein said exhaust gas component sensor disposed downstream of the exhaust gas purifying apparatus comprises a sensor capable of detecting hydrocarbons (HC), a sensor capable of detecting an air-fuel ratio, and a sensor capable of detecting nitrogen oxides (NOx).

8. A function diagnostic system according to claim 6, wherein said exhaust gas component sensor disposed downstream of the catalyst comprises one of a sensor capable of detecting hydrocarbons (HC), a sensor capable of detecting an air-fuel ratio, and a sensor capable of detecting nitrogen oxides (NOx).

9. A function diagnostic system for diagnosing functioning of a catalyst for exhaust gas purifying of an internal combustion engine system using only a downstream exhaust gas component sensor having an exhaust gas component detecting function, without an upstream exhaust gas component sensor, said downstream exhaust gas component sensor being disposed downstream of the catalyst in the internal combustion engine system, said function diagnostic system comprising means for checking the function of said catalyst on the basis of an output of said exhaust gas component sensor located downstream of the exhaust gas purifying apparatus without the need for an upstream exhaust gas component sensor by subjecting the output of said downstream exhaust gas component sensor to an integral processing and checking the function of the catalyst on the basis of the thus-integrated value, wherein said exhaust gas component sensor disposed downstream of the catalyst comprises a sensor capable of detecting hydrocarbons (HC), and wherein the function checking means determines a mean value of HC quantity as:

$$IT = \int HC \times QA \times (HC \text{ to air molecular weight ratio}) \, dt / \int VSPdt \; (q/km),$$

where QA is intake air volume; and

VSP is vehicle speed.

10. A function diagnostic system according to claim 9, further including at least one of means for determining an operating condition of said catalyst, means for determining an operating condition of said engine, and means for determining an operating condition of a vehicle driven by the engine, and wherein in accordance with at least one of the thus-determined operating condition of the catalyst, operating condition of the engine and operating condition of the vehicle, the output of said exhaust gas component sensor disposed downstream of the catalyst is evaluated to check the function of the catalyst.

* * * * *